United States Patent Office 3,808,189
Patented Apr. 30, 1974

---

3,808,189
ISOLATION OF GAMMA GLOBULIN PREPARATIONS ENRICHED IN IgA AND IgM USING POLYETHYLENE GLYCOL
Charles Benedict Breuer, Pearl River, N.Y., assignor to American Cyanamid Company, Stamford, Conn.
No Drawing. Filed Mar. 15, 1973, Ser. No. 341,423
Int. Cl. C07g 7/00
U.S. Cl. 260—112 B          5 Claims

ABSTRACT OF THE DISCLOSURE

This disclosure is concerned with the isolation and recovery of immunoglobulins A and M along with gamma globulin from a fraction obtained during the isolation of albumin and gamma globulin from venous plasma, said immunoglobulins being useful for the prophylaxis and treatment of bacterial and viral infections and as replacement therapy in immune deficiency syndromes.

BACKGROUND OF THE INVENTION

This invention relates to a method of isolating and recovering an immunoglobulin A enriched fraction and an immunoglobulin M enriched fraction, both fractions consisting essentially of gamma globulin and the respective immunoglobulin, from a byproduct fraction obtained from a process of isolating albumin and gamma globulin from venous plasma, utilizing polyethylene glycol to isolate both the immunoglobulin A and immunoglobulin M fractions.

Immunoglobulin A was first isolated from human serum by J. F. Heremans [Clin. Chim. Acta 4, 96 (1959)] by a process based upon the solubility of the complex of zinc with immunoglobulin A. The crude immunoglobulin A thus obtained was finally purified by zone electrophoresis but the method was generally unsatisfactory. Another method of isolating immunoglobulin A is based upon chromatographic separation on DEAE-cellulose followed by precipitation of impurities with caprylic acid; Steinbuch et al., Transfusion. T. VIII, No. 2, 141 (1965).

Immunoglobulin M was first isolated from human serum by H. J. Muller-Eberhard [Proc. Soc. Exptl, Biol. Med. 93, 146 (1956)] by ultracentrifugation followed by purification by zone eelctrophoresis. Other methods of isolating immunoglobulin M have been based upon filtration on Sephadex® G-200, a combination of preparative electrophoresis with chromatography on DEAE-cellulose, and ammonium sulfate precipitations alternating with dialyses; Steinbuch et al., supra.

As pointed out above, the prior art methods of recovering immunoglobulin A and immunoglobulin M fractions from human serum are cumbersome, expensive, and time-consuming. It is an advantage of the novel process of the present invention that exotic techniques such as electrophoresis and chromatography are unncessary and hence the recovery of the immunoglobulins may be carried out on a large scale. It is a further advantage of the novel process of the present invention that it uses known reagents, which are readily available and relatively inexpensive, and it uses process steps familiar to, and compatible with, commercial manufacture of other blood products.

My issued U.S. Pat. No. 3,597,409 is directed toward a process for the recovery of immunoglobulin A and M from human blood protein fractions. The process specifically disclosed in my '409 patent employs a starting material derived from placental blood, the fraction designated III, by Cohn et al., J. Am. Chem. Soc., 68,459 ff. (1946). The process described in my aforesaid patent does not work adequately for the fraction from venous blood material of the present invention. Additionally, the present invention isolates both immunoglobulin A and M using polyethylene glycol whereas in my aforesaid patent polyethylene glycol is used to isolate only immunoglobulin A while immunoglobulin M is isolated by euglobulin precipitation. Moreover, the venous fraction starting material of the present invention contains considerable amount of fibrinogen and other degraded forms of this protein, and euglobulin precipitation results in clotting and is, therefore, impractical.

U.S. Pat. No. 3,682,881 discloses a method for the fractionation of plasma using both glycine and polyethylene glycol. The '881 patent is directed toward the isolation of antihemophilic fraction A and prothrombin complex by initial fractionation with glycine followed by multiple fractionations of the AHF-containing precipitate and the prothrombin complex-containing supernate with polyethylene glycol. The '881 patent is not concerned with nor does it deal with the isolation of both IgA and IgM fractions utilizing polyethylene glycol as disclosed and claimed herein. U.S. Pat. No. 3,415,804 discloses fractionation of mixtures of proteinaceous substances, e.g., plasma proteins, in aqueous medium using polyethylene glycol as a dispersibility depressant. But, again, the '804 patent is not concerned with the isolation of IgA and IgM fractions as disclosed and claimed herein. Other known patents in the field of protein fractionation include U.S. Pats. No. 2,390,074; 2,437,060; 2,469,193; and 2,710,294. Publications known in the field of protein fractionation, include Annales de I' Institut Pasteur, 84, 370-375 (1953); and Journal of Biological Chemistry, 158, 299-301 (1944).

None of the aforementioned patents or publications deal with the simultaneous isolation of IgA and IgM using polyethylene glycol as disclosed and claimed herein.

SUMMARY OF THE INVENTION

This invention is concerned with fractional precipitation of desired proteins by known solvents and salts to achieve simultaneous isolation of immunoglobulins A (IgA) and M (IgM). The immunoglobulins A and M obtained as a result of the process of this invention are used to prepare gamma globulin enriched in either or both immunoglobulin A and immunoglobulin M for prophylaxis and therapy of bacteria and viral infections and as replacement therapy in immune deficiency syndromes.

This invention utilizes as starting material a by-product fraction obtained, but presently discarded, during the fractionation of venous plasma. This by-product fraction is designated Fraction III, 1 according to Oncley et al., J.A.C.S., vol. 71 (1949). This fraction is designated as III-2,1 in this application and is considered a "by-product" fraction since it contains no appreciable amounts of IgG or albumin, the two most desired products of blood fractionation and is, therefore, usually discarded.

The venous plasma fraction starting material containing immunoglobulin A, immunoglobulin M and gamma globulin is first dissolved in aqueous acetate buffer solution under defined conditions and then treated with a zinc salt to precipitate unwanted proteins, as zinc complexes. The supernatant fluid remaining after treatment with the zinc salt is then treated under defined conditions with polyethylene glycol in aqueous acetate buffer solution to precipitate an immunoglobulin enriched preparation consisting essentially of immunoglobulins A, M and G.

The precipitate containing the immunoglobulins A, M and G is then dissolved in aqueous acetate buffer solution and treated under defined conditions with polyethylene glycol in aqueous acetate buffer solution to precipitate, upon raising the polyethylene glycol concentration, an immunoglobulin enriched preparation, consisting essentially of immunoglobulin M and gamma globulin, while the immunoglobulin A and some gamma globulin remain in solution in the supernatant solution.

The precipitate containing the immunoglobulin enriched material, consisting essentially of immunoglobulin M and gamma globulin is dissolved in aqueous acetate buffer solution under defined conditions and treated with caprylic acid to precipitate unwanted protein impurities, principally-2-macroglobulin. The supernatant containing the IgM and IgG is then concentrated in volume, restored to volume, and reconcentrated in volume under defined conditions to give a purified immunoglobulin M enriched preparation, consisting essentially of immunoglobulin M and gamma globulin. This final product is a purified product considerably enriched with immunoglobulin M with the remainder of the protein consisting essentially of gamma globulin.

The supernatant fluid containing the immunoglobulin A and gamma globulin is then treated with polyethylene glycol under defined conditions and the immunoglobulin A and gamma globulin precipitated. This precipitate is then redissolved in aqueous saline solution and dialyzed under defined conditions to give a purified immunoglobulin A enriched preparation, consisting essentially of immunoglobulin A and gamma globulin. This final product is a purified product considerably enriched with immunoglobulin A with the remainder of the protein consisting essentially of gamma globulin.

DETAILED DESCRIPTION OF THE INVENTION

In carrying out the process of this invention a portion of venous plasma fraction III-2,1, obtained as shown in Table I, is dissolved in an aqueous sodium acetate buffer solution which is preferably 0.05 molar with respect to the sodium acetate concentration. The practical upper limit of the sodium acetate concentration in the buffer solution is 0.05 molar, but any sodium acetate concentration within the range of 0.025 to 0.07 molar gives a solution of sufficient ionic strength to dissolve the starting material. The pH of the buffer solution lies within the range of 4.6 to 5.0, preferably about 4.8. Fraction III, 2,1 starting material is dissolved in the aqueous acetate buffer solution in the proportion of from about 75 milligrams to about 125 milligrams of starting material per milliliter of aqueous buffer. This initial dissolution is carried out at a temperature of from about 0° to about 5° C. until dissolution is effected, e.g., for about 12 to about 18 hours. As a practical matter, the entire process is best carried out in a cold room having a temperature of from about 2° C. to about 4° C. for about 16 hours.

To the above solution of venous plasma fraction III-2,1 starting material in aqueous sodium acetate buffer solution is added, with agitation, such as by stirring, a 0.4 molar to 0.6 molar, preferably 0.5 molar, solution of a zinc salt, preferably zinc acetate, in water containing about 25 percent ethanol at a pH of about pH 6.2. The zinc salts which may be used are benzoate, butyrate, carbonate, oxalate, tartrate, etc. The aqueous zinc solution is added to the solution containing fraction III-2,1 in the aqueous acetate buffer until a final zinc molarity of about 0.005 is reached whereupon a heavy precipitate of the zinc complexes of undesired proteins forms. Although this precipitate may be removed immediately, stirring for a period of several hours at 0 to 5° C., preferably for about 2 to 4 hours at 4° C., is preferred prior to removal of the precipitate by filtration or centrifugation. The precipitate containing the undesired protein is discarded.

The supernatant fluid or resulting clarified solution is then warmed to about room temperature, about 20 to about 25° C., and agitated, e.g., stirred. To the clarified solution is then added, with stirring, a solution of about 50% polyethylene glycol in pH 4.4 to 5.0, preferably 4.8, aqueous sodium acetate buffer solution containing about 0.05 molar sodium acetate until a final concentration of from about 11 to 13% of polyethylene glycol, preferably about 12%, is reached whereupon a precipitate containing essentially immunoglobulin A, immunoglobulin M and gamma globulin forms. The polyethylene glycol addition step is carried out within a temperature range of about 20 to 25° C. Stirring of the above suspension is continued for about 30 minutes to one hour, preferably about 30 minutes, and the precipitate removed by filtration or centrifugation. The supernatant fluid is discarded.

The precipitate containing immunoglobulins A, M and G is then dissolved, preferably with stirring, in about 0.05 molar sodium acetate buffer at pH 5.8 for a few hours, e.g., 16 hours, at room temperature, about 20 to about 25° C. A solution of about 50% polyethylene glycol in pH 5.8 aqueous sodium acetate buffer solution containing 0.05 molar sodium acetate is then added with stirring to the solution containing immunoglobulins A, M and G, until a final polyethylene glycol concentration of about 2% is reached. Although the precipitate may be removed immediately, stirring is continued for about 30 minutes and the suspension filtered or centrifuged. The supernatant fluid contains essentially immunoglobulin A and gamma globulin. The precipitate contains essentially immunoglobulin M and gamma globulin.

For therapeutic use, the supernatant fluid containing immunoglobulin A enriched material is first dissolved in 0.25 molar glycine and lyophilized. The lyophilized powder is reconstituted at a concentration of 10–18% protein in sufficient aqueous glycine: NaCl to make a final solution 0.3 molar in glycine and 0.15 molar in sodium chloride. Merthiolate is added to a 1:10,000 final concentration and the solution is sterile filtered and vialed. For therapeutic use, the precipitate containing immunoglobulin M enriched material is dissolved in 0.15 molar sodium chloride containing a preservative such as merthiolate, sterile filtered, and vialed in concentrations of 50–100 mg./ml. The parenteral formulations thus prepared are useful for the prophylaxis and therapy of bacterial and viral infections.

The immunoglobulin A and immunoglobulin M formulations thus prepared contain a high concentration of antibodies and mere traces of impurities which do not prejudice their therapeutic utility. However, immunoglobulin preparations which are to be made the object of an immunochemical study must be extremely pure. In such case, the immunoglobulin A and immunoglobulin M enriched materials is isolated by the novel process of the present invention may be further purified as follows.

The supernatant fluid containing IgA and IgG is purified by stirring at room temperature (20°–25° C.) and adding a solution of 50% polyethylene glycol in pH 5.8 sodium acetate buffer, 0.05 M until a final polyethylene glycol concentration of about 7–9%, preferably about 8%, is reached. The mixture is stirred for 30 minutes and then filtered or centrifuged. The supernatant fluid is discarded. The precipitate is redissolved in about 0.15 to about 0.25 molar sodium chloride, preferably about 0.15 molar, containing 0.001% merthiolate and dialyzed against the same solution for 48 hours at 2 to 4° C. whereby an extremely pure mixture of immunoglobulin A and gamma globulin is obtained.

The precipitate containing IgM and IgG is purified by dissolving it in 0.025 molar to 0.07 molar aqueous sodium acetate buffer, preferably 0.05 M, at pH 4.8, at 20°–25° C. The solution is then stirred and caprylic acid is added to the solution until a final concentration of about 7.5% is reached. The mixture is stirred for about 30 minutes and then filtered or centrifuged. The precipitate is discarded. The supernatant is concentrated to ¼ of its original volume.

The polyethylene glycol contemplated in the practice of the present invention consists of a mixture of nonvolatile polyethylene glycols which are soluble in both water and organic liquids and which have molecular weights in the range of from about 4,000 to about 20,000. Such mixtures of polyethylene glycols are commercially available and are usually obtained by condensing glycol with ethylene oxide. As a rule, it is preferred to carry out the process with a polyethylene glycol having a limited molecular weight range, more particularly composed of molecules, the molecular weights of which are essentially within a narrow range of comparison with the total range as specified above. Thus, although various mixtures of the aforementioned non-volatile polyethylene glycols may be employed, it is preferred to use a mixture of polyethylene glycols having an average molecular weight of about 6000. Such a mixture is usually referred to as polyethylene glycol 6000.

TABLE I

VENOUS PLASMA

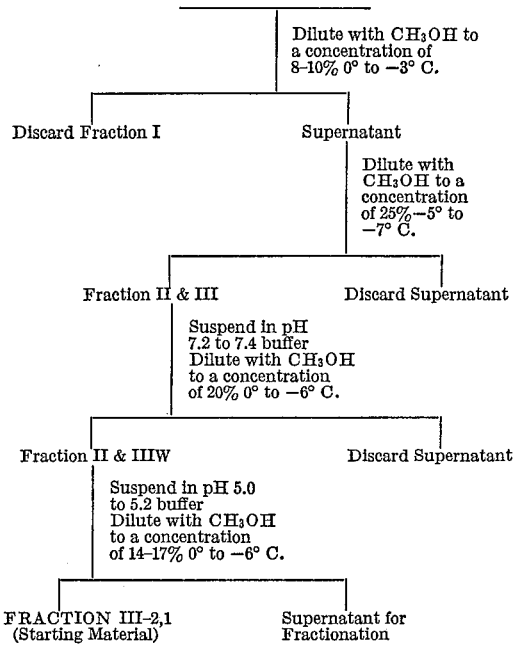

DESCRIPTION OF THE PREFERRED EMBODIMENTS

The following examples will serve to further specifically illustrate this invention.

Example I.—Separation of immunoglobulin A from immunoglobulin M

A 100 gm. portion of plasma fraction III-2,1, obtained as shown in Table I, was dissolved by stirring for 16 hours at 2°–4° C. in 1 liter of 0.05 M sodium acetate buffer, pH 4.8. To this solution was added, with stirring, a solution containing 0.5 M zinc acetate in 25% ethanol at pH 6.2 until a final zinc molarity of 0.005 was obtained. The mixture was stirred for 4 hours at 2°–4° C. and then centrifuged. The precipitate was discarded. The 1025 ml. of supernatant fluid was warmed to 20°–25° C. and stirred. A solution of 50% polyethylene glycol 6000 (PEG 6000) in pH 4.8 sodium acetate buffer was added until the PEG 6000 concentration was raised to 12%. Stirring was continued for 30 minutes and the mixture was then centrifuged. The supernatant fluid was discarded. The precipitate, containing immunoglobulins A, M and G was dissolved by stirring at 20°– 25° C. in 1 liter of 0.05 M sodium acetate buffer at pH 5.8 for 16 hours. The 1,060 ml. of solution was then stirred and a 50% solution of PEG 6000 in pH 5.8 sodium acetate buffer was added until the PEG 6000 concentration reached 2%. Stirring was continued for 30 minutes and the mixture was centrifuged. The supernatant fluid contains IgA and IgG. The precipitate contains IgM and IgG.

Example II.— Purification of IgA and IgG

The supernatant fluid from Example I containing immunoglobulin A and immunoglobulin G was stirred at 20°–25° C. A solution of 50% PEG 6000 in pH 4.8 sodium acetate buffer (0.05 M) was added until the PEG 6000 concentration was raised from 2% to 8%. The mixture was stirred for 30 minutes and then centrifuged. The supernatant fluid was discarded. The precipitate was redissolved in 50 ml. of 0.15 M NaCl containing 0.001% merthiolate and dialyzed against 100 volumes of the same solution for 48 hours at 2°–4° C. This final preparation of IgA enriched IgG contained 51% IgA with the remaining protein being IgG with traces of other serum proteins as determined by quantitative immunodiffusion assays and immunoelecrtophoresis.

Example III.—Purification of IgM and IgG

The precipitate from Example I containing immunoglobulin M and immunoglobulin G was dissolved in 200 ml. of 0.05 M sodium acetate buffer pH 4.8 at 20°–25° C. The solution was then stirred vigorously and 7.5 ml. of caprylic acid was added for each 100 ml. of IgM solution. Stirring was continued for 30 minutes and the mixture was centrifuged. The precipitate was discarded. The supernatant was concentrated to ¼ of its original volume in an Amicon ultrafiltration apparatus. The volume of the solution was restored to 100 ml. with 0.15 M NaCl containing 0.001% merthiolate and the solution was reconcentrated to ¼ of its original volume. This final preparation of IgM enriched IgG contained 59% IgM, 30% IgG and traces of serum proteins as determined by quantitative immunodiffusion assays and immunoelectrophoresis.

I claim:

1. The process of separating immunoglobulin A and immunoglobulin M, both containing gamma globulin, from a human venous plasma fraction containing them which comprises the steps of:

(a) dissolving said plasma fraction in pH 4.8 aqueous buffer solution containing 0.05 molar sodium acetate at a temperature of from about 2° to about 4° C. in the proportion of 100 mg. of plasma fraction per ml. of aqueous buffer solution;

(b) adding to the resulting solution, while stirring at a temperautre of from about 2° to about 4° C. a 0.5 molar aqueous zinc acetate solution containing about 25% ethanol at pH 6.2 until a final zinc molarity of of 0.005 is reached;

(c) stirring the resulting suspension at a temperature of from 2° to 4° C. for about 4 hours;

(d) removing precipitated material from the suspension;

(e) adding to the supernatant fluid, while stirring at a temperature of from about 20° to about 25° C. a solution of about 50% polyethylene glycol in pH 4.8 aqueous buffer solution containing 0.05 molar sodium acetate until a final concentration of 12% polyethylene glycol is reached;

(f) stirring the resulting suspension at a temperature of from about 20° to about 25° C. for about 30 minutes;

(g) removing precipitated immunoglobulin A, immunoglobulin M and gamma globulin enriched material from the suspension;

(h) dissolving said precipitate with stirring in pH 5.8 aqueous buffer solution containing 0.05 molar sodium acetate at a temperature of about 20° to about 25° C. for about 16 hours;

(i) adding to the resulting solution while stirring a solution of about 50% polyethylene glycol in pH 5.8 aqueous buffer solution containing 0.05 molar sodium acetate until a final concentration of 2% polyethylene glycol is reached;

(j) stirring the resulting suspension at a temperature of 20° to 25° C. for about 30 minutes;

(k) separating precipitated immunoglobulin M and gamma globulin enriched material from the supernatant fluid-containing immunoglobulin A and gamma globulin enriched material.

2. The process of recovering an immunoglobulin M enriched material, consisting essentially of immunoglobulin M and gamma globulin, from a human venous plasma fraction containing them which comprises the steps of:
   (a) dissolving said plasma fraction in pH 4.8 aqueous buffer solution containing 0.05 molar sodium acetate at a temperature of from about 2° to about 4° C. in the proportion of 100 mg. of plasma fraction per ml. of aqueous buffer solution;
   (b) adding to the resulting solution, while stirring at a temperature of from about 2° to about 4° C., a 0.5 molar aqueous zinc acetate solution containing about 25% ethanol at pH 6.2 until a final zinc molarity of 0.005 is reached.
   (c) stirring the resulting suspension at a temperature of from about 2° to about 4° C. for about 4 hours;
   (d) removing precipitated material from the suspension;
   (e) adding to the supernatant fluid, while stirring at a temperature of from about 20° to about 25° C., a solution of about 50% polyethylene glycol in pH 4.8 aqueous buffer solution containing 0.05 molar sodium acetate until a final concentration of 12% polyethylene glycol is reached;
   (f) stirring the resulting suspension at a temperature of from about 20° to about 25° C. for about 30 minutes;
   (g) removing precipitated immunoglobulin A, immunoglobulin M and gamma globulin enriched material from the suspension;
   (h) dissolving said precipitate while stirring in pH 5.8 aqueous buffer solution containing 0.05 molar sodium acetate at a temperature of about 20° to about 25° C. for about 16 hours;
   (i) adding to the resulting solution while stirring a solution of about 50% polyethylene glycol in pH 5.8 aqueous buffer solution containing 0.05 molar sodium acetate until a final concentration of 2% polyethylene glycol is reached;
   (j) stirring the resulting suspension at a temperature of about 20° to about 25° C. for about 30 minutes;
   (k) removing precipitated immunoglobulin M and gamma globulin enriched material from the suspension.

3. The process of claim 2 including, in combination therewith, the additional steps of dissolving the immunoglobulin M and gamma globulin enriched material in pH 4.8 aqueous buffer solution containing 0.05 molar sodium acetate at about 20° to about 25° C.; adding caprylic acid to the resulting solution with stirring until a final caprylic acid concentration of 7.5% is reached; stirring the resulting suspension for about 30 minutes; removing precipitated material from the suspension; concentrating the clarified solution to ¼ its original volume in an Amicon ultrafiltration apparatus; restoring the volume of the solution with 0.15 M sodium chloride containing 0.001% merthiolate; and reconcentrating the solution to ¼ its original volume.

4. The process of recovering an immunoglobulin A enriched material, consisting essentially of immunoglobulin A and gamma globulin, from a human venous plasma fraction containing them which comprises the steps of:
   (a) dissolving said plasma fraction in pH 4.8 aqueous buffer solution containing 0.05 molar sodium acetate at a temperature of from about 2° to about 4° C. in the proportion of 100 mg. of plasma fraction per ml. of aqueous buffer solution;
   (b) adding to the resulting solution while stirring at a temperature of from about 2° to about 4° C. a 0.5 molar aqueous zinc acetate solution containing about 25% ethanol at pH 6.2 until a final zinc molarity of 0.005 is reached;
   (c) stirring the resulting suspension at a temperature of from about 2° to about 4° C. for about 4 hours;
   (d) removing precipitated material from the suspension;
   (e) adding to the supernatant fluid while stirring at a temperature of from about 20° to about 25° C. a solution of about 50% polyethylene glycol in pH 4.8 aqueous buffer solution containing 0.05 molar sodium acetate until a final concentration of 12% polyethylene glycol is reached;
   (f) stirring the resulting suspension at a temperature of from about 20° to about 25° C. for about 30 minutes;
   (g) removing precipitated immunoglobulin A, immunoglobulinn M and gamma globulin enriched material from the suspension;
   (h) dissolving said precipitate while stirring in pH 5.8 aqueous buffer solution containing 0.05 molar sodium acetate at a temperature of about 20° to about 25° C. for about 16 hours;
   (i) adding to the resulting solution, while stirring a solution of about 50% polyethylene glycol in pH 5.8 aqueous buffer solution containing 0.05 molar sodium acetate until a final concentration of 2% polyethylene glycol is reached;
   (j) stirring the resulting suspension at a temperature of about 20° to about 25° C. for about 30 minutes;
   (k) removing the supernatant fluid containing immunoglobulin A and gamma globulin from the suspension.

5. The process of claim 4 including, in combination therewith, the additional steps of stirring the immunoglobulin A and gamma globulin enriched material at about 20° to about 25° C. for about 2 hrs.; adding to the stirred solution a solution of 50% polyethylene glycol until a final concentration of 8% polyethylene glycol is reached; stirring the suspension at about 20° to about 25° C. for about 30 minutes; removing precipitated material from the suspension; dissolving the precipitate in aqueous solution containing 0.15 molar sodium chloride and 0.001 merthiolate until a final concentration of 10 to 15% protein is reached; dialyzing the solution against the same solution for about 48 hours at about 2° to about 4° C.

References Cited
UNITED STATES PATENTS

| | | | |
|---|---|---|---|
| 3,415,804 | 12/1968 | Polson | 260—112 |
| 3,597,409 | 8/1971 | Breuer | 260—112 |
| 3,763,135 | 10/1973 | Shanbrom et al. | 260—112 |

HOWARD E. SCHAIN, Primary Examiner

U.S. Cl. X.R.

424—177